US012230755B2

United States Patent
Lee et al.

(10) Patent No.: US 12,230,755 B2
(45) Date of Patent: Feb. 18, 2025

(54) METHOD FOR MANUFACTURING ALL-SOLID-STATE BATTERY INCLUDING SOLID-LIQUID HYBRID ELECTROLYTE MEMBRANE, AND SOLID-LIQUID HYBRID ELECTROLYTE MEMBRANE

(71) Applicant: LG ENERGY SOLUTION, LTD., Seoul (KR)

(72) Inventors: Jung-Pil Lee, Daejeon (KR); Guilong Jin, Daejeon (KR); Ji-Young Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 590 days.

(21) Appl. No.: 17/611,431

(22) PCT Filed: Jan. 14, 2021

(86) PCT No.: PCT/KR2021/000525
§ 371 (c)(1),
(2) Date: Nov. 15, 2021

(87) PCT Pub. No.: WO2021/145690
PCT Pub. Date: Jul. 22, 2021

(65) Prior Publication Data
US 2022/0181688 A1 Jun. 9, 2022

(30) Foreign Application Priority Data
Jan. 14, 2020 (KR) .................. 10-2020-0004979

(51) Int. Cl.
*H01M 10/0565* (2010.01)
*H01M 10/0525* (2010.01)

(52) U.S. Cl.
CPC ... *H01M 10/0565* (2013.01); *H01M 10/0525* (2013.01); *H01M 2300/0037* (2013.01);
(Continued)

(58) Field of Classification Search
CPC ......... H01M 10/0565; H01M 10/0525; H01M 2300/0037; H01M 2300/0082;
(Continued)

(56) References Cited

U.S. PATENT DOCUMENTS

| 5,609,795 A | 3/1997 | Matsumoto et al. |
| 2004/0151985 A1 | 8/2004 | Munshi |

(Continued)

FOREIGN PATENT DOCUMENTS

| CN | 106450424 A | 2/2017 |
| CN | 107645013 A | 1/2018 |

(Continued)

OTHER PUBLICATIONS

Office Action issued in related Japanese Patent Application No. 2022-505495 dated Jul. 31, 2023.

(Continued)

*Primary Examiner* — Adam A Arciero
(74) *Attorney, Agent, or Firm* — Morgan, Lewis & Bockius LLP

(57) ABSTRACT

The present disclosure relates to a solid-liquid hybrid electrolyte membrane including a predetermined amount of liquid electrolyte in a porous structure formed by solid polymer particles, and a method for manufacturing a solid-state battery including the same. According to an embodiment of the present disclosure, it is possible to manufacture a battery without any separate step of injecting an electrolyte. In addition, since the solid-state battery includes a liquid electrolyte, it is possible to ensure improved ion conductivity as compared to the conventional solid electrolyte batteries.

10 Claims, 2 Drawing Sheets

(52) U.S. Cl.
CPC .............. *H01M 2300/0082* (2013.01); *H01M 2300/0094* (2013.01)

(58) Field of Classification Search
CPC . H01M 2300/0094; H01M 2300/0084; H01M 50/449; H01M 10/0566; H01M 10/058; H01M 10/05; H01M 10/056; H01M 10/0564; H01M 10/0585; H01M 10/052; H01M 2300/0091
See application file for complete search history.

(56) References Cited

U.S. PATENT DOCUMENTS

| | | | |
|---|---|---|---|
| 2012/0231346 A1 | 9/2012 | Tsujii et al. | |
| 2014/0004406 A1 | 1/2014 | Chang et al. | |
| 2014/0093784 A1 | 4/2014 | Kwon et al. | |
| 2015/0004499 A1 | 1/2015 | Kitagawa et al. | |
| 2016/0186334 A1 | 6/2016 | Murahara | |
| 2016/0293999 A1* | 10/2016 | Kim ................... | H01M 4/0404 |
| 2018/0062139 A1 | 3/2018 | Kashiwazaki et al. | |
| 2018/0166743 A1 | 6/2018 | Lee et al. | |
| 2018/0277891 A1 | 9/2018 | Mimura et al. | |
| 2021/0193997 A1* | 6/2021 | Kim ................... | H01M 4/587 |

FOREIGN PATENT DOCUMENTS

| | | |
|---|---|---|
| CN | 110233285 A | 9/2019 |
| JP | H05-299119 A | 11/1993 |
| JP | H05-325990 A | 12/1993 |
| JP | H10-338799 A | 12/1998 |
| JP | H11-329501 A | 11/1999 |
| JP | 2000-149659 A | 5/2000 |
| JP | 2002-352859 A | 12/2002 |
| JP | 2002-543554 A | 12/2002 |
| JP | 2003-536233 A | 12/2003 |
| JP | 2004-087334 A | 3/2004 |
| JP | 2009-259755 A | 11/2009 |
| JP | 5924627 B2 | 5/2016 |
| JP | 2017-014493 A | 1/2017 |
| JP | 2017-103027 A | 6/2017 |
| JP | 2018-037310 A | 3/2018 |
| KR | 10-0327488 B1 | 3/2002 |
| KR | 10-2013-0004084 A | 1/2013 |
| KR | 10-1355836 B1 | 1/2014 |
| KR | 10-2016-0052560 A | 5/2016 |
| KR | 10-2018-0068115 A | 6/2018 |
| KR | 10-2018-0083946 A | 7/2018 |
| WO | 2000/038263 A1 | 6/2000 |
| WO | 01/99220 A1 | 12/2001 |
| WO | 2011/049113 A1 | 4/2011 |
| WO | 2018/190665 A1 | 10/2018 |

OTHER PUBLICATIONS

International Search Report issued in corresponding International Patent Application No. PCT/KR2021/000525, dated Apr. 19, 2021.
Office Action issued in related Chinese Patent Application No. 202180003246.2 dated Jun. 14, 2023.
Extended European Search Report dated Jul. 7, 2022 issued by the European Patent Office in corresponding European Patent Application No. 21741619.7.

* cited by examiner

METHOD FOR MANUFACTURING ALL-SOLID-STATE BATTERY INCLUDING SOLID-LIQUID HYBRID ELECTROLYTE MEMBRANE, AND SOLID-LIQUID HYBRID ELECTROLYTE MEMBRANE

TECHNICAL FIELD

The present application claims priority to Korean Patent Application No. 10-2020-0004979 filed on Jan. 14, 2020 in the Republic of Korea, the disclosures of which are incorporated herein by reference. The present disclosure relates to a method for manufacturing a solid-state battery including a solid-liquid hybrid electrolyte membrane, and a solid-liquid hybrid electrolyte membrane.

BACKGROUND ART

Importance of lithium secondary batteries has been increased, as use of vehicles, computers and portable terminals has been increased. Particularly, there is a high need for development of lithium secondary batteries having a low weight and providing a high energy density.

The lithium secondary battery can be obtained by interposing a separator between a positive electrode and a negative electrode and injecting a liquid electrolyte thereto, or by interposing a solid electrolyte membrane between a positive electrode and a negative electrode.

However, in the case of a lithium ion battery using a liquid electrolyte, the negative electrode and the positive electrode are divided from each other by the separator. Therefore, when the separator is damaged by deformation or external impact, a short-circuit may occur, resulting in a risk, such as overheating or explosion.

A lithium secondary battery using a solid electrolyte is advantageous in that it has enhanced safety and prevents leakage of an electrolyte to improve the reliability of the battery and to allow easy manufacture of a thin battery. However, even though a solid electrolyte is used, there is still a need for development of a solid electrolyte membrane having high energy density and improved processability. In addition, in the case of a solid electrolyte, it has low ion conductivity to cause the problem of degradation of performance, and shows a significantly larger thickness as compared to the thickness of a conventional porous polyolefin-based separator to cause loss of energy density. Under these circumstances, there is a need for a technical solution capable of overcoming the problems.

DISCLOSURE

Technical Problem

The present disclosure is designed to solve the problems of the related art, and therefore the present disclosure is directed to providing a method for manufacturing a solid-state battery without any separate step of injecting a liquid electrolyte to an electrode assembly after manufacturing the electrode assembly, or by injecting merely a small amount of liquid electrolyte to an electrode assembly.

In addition, there is no need for a time during which electrodes are impregnated with a liquid electrolyte due to the step of injecting a liquid electrolyte to a conventional electrode assembly, after manufacturing the electrode assembly, and it is possible to reduce the time required for impregnating the inner part of an electrode with a liquid electrolyte.

In addition, it is possible to minimize the amount of a liquid electrolyte and to reduce a risk of leakage, even when external impact is applied to a battery.

Additionally, it is possible to provide significantly improved ion conductivity as compared to the conventional solid-state batteries.

In addition, the present disclosure is directed to providing a solid-liquid hybrid electrolyte membrane which has improved mechanical strength, even though it is a thinner film as compared to commercially available solid electrolyte membranes.

The present disclosure is also directed to providing a solid-liquid hybrid electrolyte membrane which can be formed into a thinner film as compared to the commercially available solid electrolyte membranes and has improved energy density per weight based on the thickness.

These and other objects and advantages of the present disclosure may be understood from the following detailed description. Also, it will be easily understood that the objects and advantages of the present disclosure may be realized by the means shown in the appended claims and combinations thereof.

Technical Solution

In one aspect of the present disclosure, there is provided a method for manufacturing a solid-state battery according to any one of the following embodiments.

According to the first embodiment of the present disclosure, there is provided a method for manufacturing a solid-state battery, including the steps of:

(S1) preparing a solid-liquid hybrid electrolyte membrane including a plurality of solid polymer particles and a liquid electrolyte, wherein the solid polymer particles are packed, while being in contact with one another, and include a porous structure having a pore structure formed among the solid polymer particles, the liquid electrolyte surrounds the portions in which the solid polymer particles are in surface contact with one another, or the surfaces of the solid polymer particles, and the content of the liquid electrolyte is 30-40 wt % based on 100 wt % of the total content of the solid-liquid hybrid electrolyte membrane;

(S2) interposing the solid-liquid hybrid electrolyte membrane between electrodes to obtain an electrode assembly; and (S3) pressurizing the electrode assembly, wherein the ratio (B/A) of the thickness (B) of the solid-liquid hybrid electrolyte membrane after pressurizing the electrode assembly based on the thickness (A) of the solid-liquid hybrid electrolyte membrane before pressurizing the electrode assembly is 86-92%.

According to the second embodiment of the present disclosure, there is provided the method for manufacturing a solid-state battery as defined in the first embodiment, wherein step (S1) includes the steps of: (S11) preparing a composition containing a plurality of polymer particles dispersed in a solvent; (S12) applying the composition onto a substrate, followed by drying, to form a preliminary porous structure; (S13) pressurizing the product of step (S12) to form a porous structure; and (S14) impregnating the porous structure with a liquid electrolyte to obtain a solid-liquid hybrid electrolyte membrane, and the content of the liquid electrolyte is 30-40 wt % based on the total weight of the solid-liquid hybrid electrolyte membrane.

According to the third embodiment of the present disclosure, there is provided the method for manufacturing a solid-state battery as defined in the first or the second embodiment, wherein step (S3) is carried out by pressurizing the electrode assembly so that the liquid electrolyte in the solid-liquid hybrid electrolyte membrane may be ejected and the electrodes may be impregnated with the liquid electrolyte.

According to the fourth embodiment of the present disclosure, there is provided the method for manufacturing a solid-state battery as defined in any one of the first to the third embodiments, wherein the solid polymer particle is an engineering plastic resin.

According to the fifth embodiment of the present disclosure, there is provided the method for manufacturing a solid-state battery as defined in any one of the first to the fourth embodiments, wherein the solid polymer particle includes any one selected from polyphenylene sulfide, polyetherether ketone, polyimide, polyamideimide, liquid crystal polymer, polyether imide, polysulfone, polyarylate, polyethylene terephthalate, polybutylene terephthalate, polyoxymethylene, polycarbonate, polypropylene, polyethylene and polymethyl methacrylate, or two or more of them.

According to the sixth embodiment of the present disclosure, there is provided the method for manufacturing a solid-state battery as defined in any one of the first to the fifth embodiments, wherein the solid-liquid hybrid electrolyte membrane is free of a binder polymer.

According to the seventh embodiment of the present disclosure, there is provided the method for manufacturing a solid-state battery as defined in any one of the first to the sixth embodiments, which is free of a step of injecting an electrolyte.

According to the eighth embodiment of the present disclosure, there is provided the method for manufacturing a solid-state battery as defined in any one of the first to the seventh embodiments, wherein the content of the liquid electrolyte is 31-36 wt % based on the total weight of the solid polymer particles.

According to the ninth embodiment of the present disclosure, there is provided the method for manufacturing a solid-state battery as defined in any one of the second to the eighth embodiments, wherein the impregnation in step (S14) is carried out by any one of dip coating, spray coating and drop coating.

According to the tenth embodiment of the present disclosure, there is provided the method for manufacturing a solid-state battery as defined in any one of the first to the ninth embodiments, wherein the solid-liquid hybrid electrolyte membrane further includes a porous polymer substrate or a non-woven web substrate.

In another aspect of the present disclosure, there is provided a solid-liquid hybrid electrolyte membrane according to any one of the following embodiments.

According to the eleventh embodiment of the present disclosure, there is provided a solid-liquid hybrid electrolyte membrane, which includes a plurality of solid polymer particles and a liquid electrolyte, and has an ion conductivity of $1 \times 10^{-5}$ to $1 \times 10^{-1}$ S/cm, wherein the solid polymer particles are packed, while being in contact with one another, and include a porous structure having a pore structure formed among the solid polymer particles, the liquid electrolyte surrounds the portions in which the solid polymer particles are in surface contact with one another, or the surfaces of the solid polymer particles, and the content of the liquid electrolyte is 30-40 wt % based on 100 wt % of the total content of the solid-liquid hybrid electrolyte membrane.

According to the twelfth embodiment of the present disclosure, there is provided the solid-liquid hybrid electrolyte membrane as defined in the eleventh embodiment, which further includes a porous polymer substrate or a non-woven web substrate.

Advantageous Effects

According to an embodiment of the present disclosure, it is possible to provide a solid-state battery having an ion conductivity equivalent to or similar to the ion conductivity of a conventional solid-state battery by injecting a small amount of liquid electrolyte or by injecting no liquid electrolyte, after manufacturing an electrode assembly. In addition, there is no need for a time during which electrodes are impregnated with a liquid electrolyte due to the step of injecting a liquid electrolyte to an electrode assembly, and it is possible to reduce the time required for impregnating the inner part of an electrode with a liquid electrolyte, which is advantageous in terms of processability.

According to an embodiment of the present disclosure, since a particle-shaped polymer capable of being compressed is used, it is possible to provide a solid-liquid hybrid electrolyte membrane having improved mechanical strength. In addition, since no solid electrolyte is used, it is possible to provide a solid-liquid hybrid electrolyte membrane which can be deformed by external pressurization. Further, the polymer particles are bound physically with one another, which is favorable to porosity and pore channel formation.

According to an embodiment of the present disclosure, since no binder polymer is used, it is possible to provide a solid-liquid hybrid electrolyte membrane showing low resistance.

Meanwhile, according to an embodiment of the present disclosure, a small amount of liquid electrolyte is used to ensure improved ion conductivity as compared to conventional solid electrolyte batteries, while preventing electrolyte leakage.

In addition, it is possible to provide a solid-liquid hybrid electrolyte membrane which can be formed into a thinner film as compared to commercially available solid electrolyte membranes and has improved energy density per weight based on the thickness.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing. Meanwhile, shapes, sizes, scales or proportions of some constitutional elements in the drawings may be exaggerated for the purpose of clearer description.

BEST MODE

Figure 1:
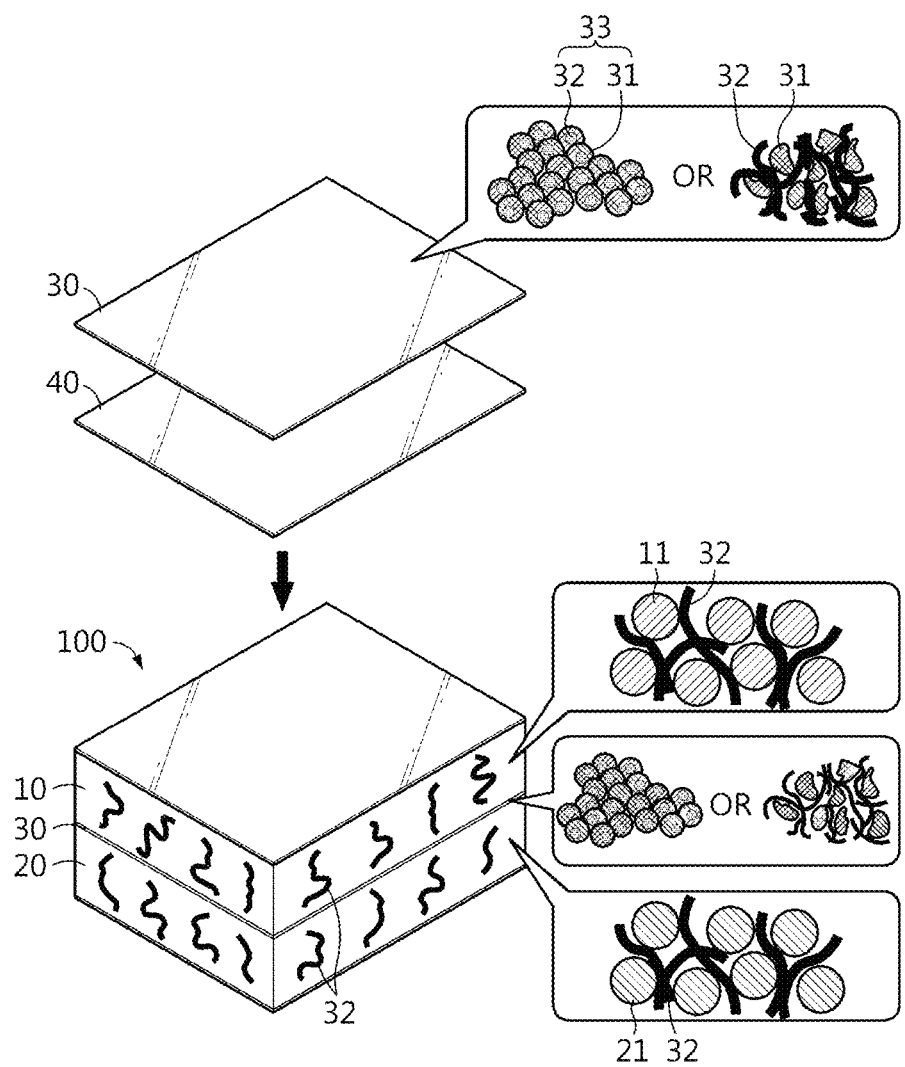
FIG. 1 is a schematic view illustrating the structure of the solid-liquid hybrid electrolyte membrane according to an embodiment of the present disclosure and that of a solid-state battery including the same.

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

Throughout the specification, the expression 'a part includes an element' does not preclude the presence of any additional elements but means that the part may further include the other elements, unless otherwise stated.

As used herein, the terms 'approximately', 'substantially', or the like, are used as meaning contiguous from or to the stated numerical value, when an acceptable preparation and material error unique to the stated meaning is suggested, and are used for the purpose of preventing an unconscientious invader from unduly using the stated disclosure including an accurate or absolute numerical value provided to help understanding of the present disclosure.

As used herein, the expression 'A and/or B' means 'A, B or both of them'.

Specific terms used in the following description are for illustrative purposes and are not limiting. Such terms as 'right', 'left', 'top surface' and 'bottom surface' show the directions in the drawings to which they are referred. Such terms as 'inwardly' and 'outwardly' show the direction toward the geometrical center of the corresponding apparatus, system and members thereof and the direction away from the same, respectively. 'Front', 'rear', 'top' and 'bottom' and related words and expressions show the positions and points in the drawings to which they are referred and should not be limiting. Such terms include the above-listed words, derivatives thereof and words having similar meanings.

The present disclosure relates to a solid-liquid hybrid electrolyte membrane and a method for manufacturing a solid-state battery including the same. In the method for manufacturing a solid-state battery according to an embodiment of the present disclosure, a solid-liquid hybrid electrolyte membrane including a pore structure formed by a plurality of solid polymer particles is used, wherein the pore structure is impregnated sufficiently with a liquid electrolyte. When the solid-liquid hybrid electrolyte membrane impregnated sufficiently with a liquid electrolyte is interposed as a separator layer between electrodes and the resultant electrode assembly is pressurized, the liquid electrolyte contained in the solid-liquid hybrid electrolyte membrane is ejected and the electrodes are impregnated with the liquid electrolyte. Therefore, there is no need for a separate step of injecting an electrolyte, after manufacturing an electrode assembly, or merely a small amount of liquid electrolyte is injected to an electrode assembly. In this manner, it is possible to provide a solid-state battery which is prevented from electrolyte leakage, has an ion conductivity equivalent to or similar to the ion conductivity of conventional solid-state batteries, and shows uniform ion conductivity.

Figure 2:
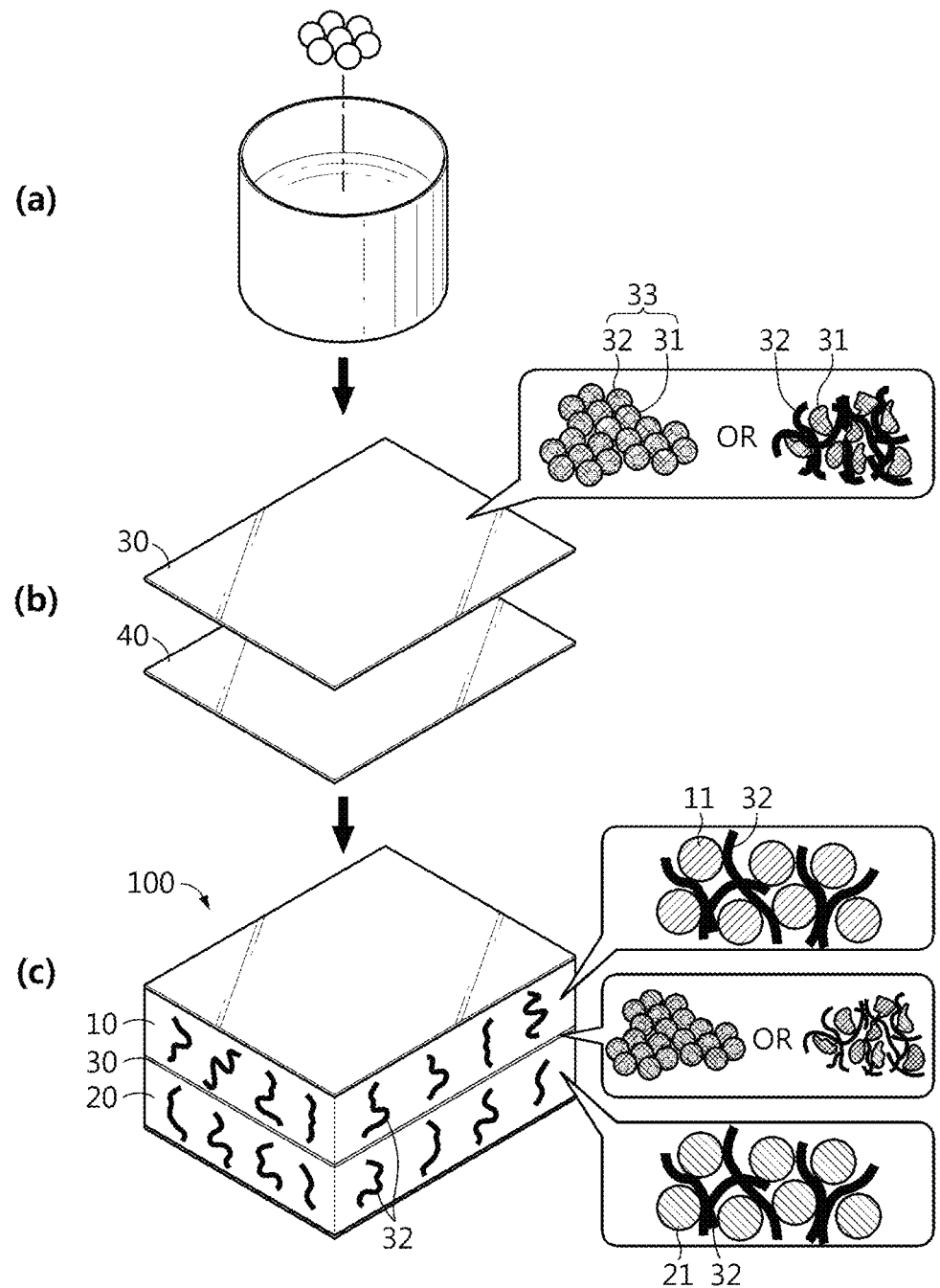
FIG. 2 is a schematic view illustrating the method for manufacturing a solid-state battery according to an embodiment of the present disclosure.

FIG. 1 is a schematic view illustrating the structure of the solid-liquid hybrid electrolyte membrane according to an embodiment of the present disclosure and that of a solid-state battery including the same. FIG. 2 is a schematic view illustrating the method for manufacturing a solid-state battery according to an embodiment of the present disclosure. Hereinafter, the present invention will be explained in more detail with reference to the accompanying drawings.

Referring to FIG. 1, the solid-state battery 100 according to an embodiment of the present disclosure includes a positive electrode 10, a negative electrode 20 and a solid-liquid hybrid electrolyte membrane 30 interposed between the positive electrode and the negative electrode.

Herein, the solid-liquid hybrid electrolyte membrane 30 includes a plurality of solid polymer particles 31 and a predetermined amount of liquid electrolyte 32.

The solid polymer particle is present in a solid state at room temperature, and is a polymer material having low solubility to the electrolyte.

Meanwhile, according to the present disclosure, the solid polymer particles are surrounded with the liquid electrolyte, and preferably have low solubility to the liquid electrolyte. In addition, the solid polymer particle is a polymer having excellent chemical resistance, preferably.

Particularly, the solid polymer particles have a solubility of less than 30%, when being impregnated with a liquid electrolyte, such as ethylene carbonate:ethyl methyl carbonate=30:70 (vol %). More particularly, the solid polymer particles may have a solubility of less than 20%, less than 15%, or less than 10%. Therefore, the solid polymer particles may be present in a solid state, even when they are dispersed in a solvent.

Particularly, the solid polymer particle may be an engineering plastic resin.

Herein, the engineering plastic resin may include any one selected from polyphenylene sulfide, polyetherether ketone, polyimide, polyamideimide, liquid crystal polymer, polyether imide, polysulfone, polyarylate, polyethylene terephthalate, polybutylene terephthalate, polyoxymethylene, polycarbonate, polypropylene, polyethylene and polymethyl methacrylate, or two or more of them. In addition, the engineering plastic resin may have a molecular weight of 100,000-10,000,000 Da.

The solid polymer particles have compressibility, unlike the conventional commercially available inorganic particles. Therefore, it is possible to provide a lithium secondary battery having increased energy density per weight based on the thickness. In addition, it is possible to provide a deformable solid-liquid hybrid electrolyte membrane by using solid polymer particles instead of the conventional solid electrolyte. The solid polymer particles have ductility, and thus can be interconnected physically or chemically under pressurization or heating. As a result, the solid-liquid hybrid electrolyte membrane according to the present disclosure requires no separate binder polymer. In other words, the solid-liquid hybrid electrolyte membrane is free of a binder polymer. Therefore, it is possible to provide a solid-liquid hybrid electrolyte membrane showing reduced resistance.

According to an embodiment of the present disclosure, the solid polymer particles may have an average particle diameter of 100 nm to 10 μm, 200 nm to 5 μm, or 500 nm to 2 μm. When the solid polymer particles have a particle diameter controlled within the above-defined range, it is possible to obtain a suitable pore size, to prevent a short-circuit, and to allow sufficient impregnation with the liquid electrolyte.

The solid polymer particles are packed, while being in contact with one another, and a pore structure is formed among the solid polymer particles.

Herein, the solid polymer particles may be in contact with one another by being packed under external pressure. For example, the external pressure may be monoaxial pressurization, roll pressing, cold isostatic press (CIP), hot isostatic press (HIP), or the like. However, the scope of the present disclosure is not limited thereto, and any physical or chemical process capable of adhering the solid polymer particles with one another may be used.

Herein, the solid polymer particles may undergo plastic deformation beyond the physical elastic region of the particles by the above-mentioned external pressure, and thus have an increased contact surface between particles as compared to the particles before applying the pressure or undergo a change in volume to generate a new contact surface, or the adhesion of the adhesion surface between particles is increased due to the plastic deformation to form a desired structure. For example, the solid polymer particles may be pelletized.

The liquid electrolyte surrounds the portions in which the solid polymer particles are in surface contact with one another, or the surfaces of the solid polymer particles. In other words, the surfaces of the solid polymer particles may be coated with the liquid electrolyte. Since the liquid electrolyte is present as mentioned above, it is possible to provide a solid-liquid hybrid electrolyte membrane having high ion conductivity.

According to an embodiment of the present disclosure, the liquid electrolyte is present in a predetermined amount. The liquid electrolyte is present in such a manner that the porous structure 33 formed by the solid polymer particles may be impregnated with the liquid electrolyte.

Then, as described hereinafter, the porous composite electrolyte membrane impregnated with the liquid electrolyte is interposed between a positive electrode and a negative electrode, and pressurization is carried out so that the liquid electrolyte may be ejected into the electrodes. Therefore, according to an embodiment of the present disclosure, it is possible to provide a solid-state battery having an ion conductivity equivalent to or similar to the ion conductivity of a conventional solid-state battery by injecting a small amount of liquid electrolyte or by using no separate step of injecting an electrolyte, after manufacturing an electrode assembly.

Herein, the content of the liquid electrolyte is 30-40 wt % based on 100 wt % of the total content of the solid-liquid hybrid electrolyte membrane. Particularly, the content of the liquid electrolyte may be 30 wt % or more, 31 wt % or more, 32 wt % or more, or 33 wt % or more, based on the total weight of the solid-liquid hybrid electrolyte membrane. In addition, the content of the liquid electrolyte may be 40 wt % or less, 39 wt % or less, 38 wt % or less, or 37 wt % or less, based on the total weight of the solid-liquid hybrid electrolyte membrane. In other words, since the solid-liquid hybrid electrolyte membrane according to an embodiment of the present disclosure has the above-defined range of liquid electrolyte content, it is possible to provide high ion conductivity and a desired level of mechanical strength, when the solid-liquid hybrid electrolyte membrane is subsequently interposed between a positive electrode and a negative electrode. When the content of the liquid electrolyte is less than 30 wt %, it is not possible to provide a desired level of ion conductivity. When the content of the liquid electrolyte is larger than 40 wt %, it is difficult to form a porous structure by using solid polymer particles, and even if a porous structure is formed, the porous structure shows low strength due to the electrolyte and is hardly retained.

Meanwhile, according to an embodiment of the present disclosure, even though the liquid electrolyte is present in a predetermined amount, it is possible to provide a solid-liquid hybrid electrolyte membrane having high ion conductivity. This is because the liquid electrolyte is dispersed homogeneously on the surfaces of the solid polymer particles or the portions in which the solid polymer particles are in surface contact with one another. According to an embodiment of the present disclosure, dip coating, spray coating or drop coating may be used to carry out such homogeneous impregnation with the liquid electrolyte.

According to an embodiment of the present disclosure, the liquid electrolyte cannot dissolve the solid polymer particles and has excellent chemical resistance and electrochemical resistance.

For example, the liquid electrolyte is a salt having a structure of $A^+B^-$, wherein $A^+$ includes an alkali metal cation such as $Li^+$, $Na^+$, $K^+$ or a combination thereof, and $B^-$ includes an anion such as $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$, $C(CF_2SO_2)_3^-$ or a combination thereof, wherein the salt may be dissolved or dissociated in an organic solvent, such as an ether-based solvent, carbonate-based solvent, nitrile-based solvent, or the like, but is not limited thereto.

For example, the ether-based organic solvent may include dimethyl ether, diethyl ether, dipropyl ether, methyl ethyl ether, methyl propyl ether, ethyl propyl ether, 1,2-dimethoxyethane, or a mixture of two or more of them.

For example, the carbonate-based organic solvent may include propylene carbonate (PC), ethylene carbonate (EC), diethyl carbonate (DEC), dimethyl carbonate (DMC), dipropyl carbonate (DPC), ethyl methyl carbonate (EMC), or a mixture of two or more of them.

For example, the nitrile-based organic solvent may include acetonitrile, succinonitrile, or a mixture of two or more of them.

In addition to the above-listed solvents, the organic solvent may include dimethyl sulfoxide, dimethoxyethane, diethoxyethane, tetrahydrofuran, N-methyl-2-pyrrolidone (NMP), gamma-butyrolactone (γ-butyrolactone) or a mixture thereof, but is not limited thereto.

In the solid-liquid electrolyte membrane according to an embodiment of the present disclosure, the porous structure itself has a higher porosity than the porosity of the solid-liquid hybrid electrolyte membrane.

Particularly, the porous structure itself may have a porosity of 1-90 vol %, 5-80 vol %, 10-70 vol %, or 20-50 vol %, The solid-liquid hybrid electrolyte membrane has a lower porosity than the porosity of the porous structure itself, and particularly, may have a porosity of 0-80 vol %, 5-60 vol %, 10-30 vol %, or 15-20 vol %.

In addition, in the solid-liquid hybrid electrolyte membrane according to an embodiment of the present disclosure, the ion conductivity of the solid-liquid hybrid electrolyte membrane is higher than the ion conductivity of the porous structure itself.

Further, the ion conductivity of the solid-liquid electrolyte membrane according to an embodiment has a higher ion conductivity than the ion conductivity of the porous structure itself, and may have an ion conductivity of $1 \times 10^{-5}$ to $1 \times 10^{-1}$ S/cm, $1 \times 10^{-4}$ to $1 \times 10^{-2}$ S/cm, or $1 \times 10^{-4}$ to $5 \times 10^{-3}$ S/cm.

As described above, even though the solid-liquid hybrid electrolyte membrane according to an embodiment of the present disclosure has a lower porosity as compared to the porous structure, it shows a higher ion conductivity as compared to the porous structure itself.

Meanwhile, the porosity and pore size of the porous structure itself and the electrolyte membrane according to the present disclosure may be controlled by adjusting the average particle diameter of the solid polymer particles or the pressurization condition during the manufacture. For example, the porosity and pore size may be controlled by adjusting the roll gap of a roll press, controlling the temperature during the manufacture, or by controlling the content or particle diameter of the solid polymer particles.

According to an embodiment of the present disclosure, the porous structure may have a thickness of 10-500 µm, 20-300 µm, or 30-100 µm. According to an embodiment of the present disclosure, use of a thin film-type porous structure having a thickness of 10-50 µm is favorable in terms of the energy density of a lithium secondary battery obtained subsequently.

According to an embodiment of the present disclosure, the solid-liquid hybrid electrolyte membrane may have a thickness of 10-500 µm, 20-300 µm, or 30-100 µm. According to an embodiment of the present disclosure, a separator in the form of a thin film having thickness of 10-50 µm can be provided, which is favorable to the energy density of a lithium secondary battery obtained subsequently.

According to an embodiment of the present disclosure, the solid-liquid hybrid electrolyte membrane may further include a porous polymer substrate or a non-woven web substrate. Particularly, the solid-liquid hybrid electrolyte membrane according to an embodiment of the present disclosure has a large amount of liquid electrolyte with which it is impregnated. Therefore, when forming the solid-liquid hybrid electrolyte membrane on the porous polymer substrate or the non-woven web substrate, or when a separate porous polymer substrate or non-woven web substrate is inserted, there is an advantage of high mechanical strength.

Particularly, the non-woven web substrate may include polyolefin, such as polyethylene or polypropylene, polyethylene terephthalate, polyester, polyamide, polyacetal, polycarbonate, polyimide, polyetherether ketone, polyether sulfone, polyphenylene oxide, polyphenylene sulfide, polyethylene naphthalene, or a mixture thereof.

Herein, the porous polymer substrate or the non-woven web substrate may include pores having an average diameter of 10 nm to 100 µm, 100 nm to 10 µm, or 500 nm to 5 µm, and may have a porosity of 10-98 vol %, 30-90 vol %, or 40-80 vol %.

Meanwhile, the solid polymer particles may be partially embedded in the pores of the non-woven web substrate, wherein the surfaces of the solid polymer particles and the substrate may be surrounded with the liquid electrolyte.

Meanwhile, the solid polymer particles may be disposed on at least one surface of the non-woven web substrate, wherein the surfaces of the solid polymer particles and the substrate may be surrounded with the liquid electrolyte.

As used herein, the term 'pore' may have various types of pore structures, and any type of pore having an average pore size satisfying the above-defined average pore size, as determined by using porosimetry or as observed through field emission-scanning electron microscopy (FE-SEM), falls within the scope of the present disclosure.

In another aspect of the present disclosure, there is provided a method for manufacturing a solid-state battery according to any one of the following embodiments. The method is shown schematically in FIG. 2.

First, prepared is a solid-liquid hybrid electrolyte membrane including a plurality of solid polymer particles and a liquid electrolyte, wherein the solid polymer particles are packed, while being in contact with one another, a porous structure is formed among the solid polymer particles, the liquid electrolyte surrounds the portions in which the solid polymer particles are in surface contact with one another, or the surfaces of the solid polymer particles, and the content of the liquid electrolyte is 30-40 wt % based on 100 wt % of the total content of the solid-liquid hybrid electrolyte membrane (S1). This step is shown in FIG. 2(a). As shown in FIG. 2(a), a composition containing a plurality of polymer particles dispersed in a solvent may be used. Herein, the polymer particles are the same as described above. In addition, the solvent is capable of dispersing the solid polymer particles. For example, the solvent may be ethanol, methanol, or the like.

Particularly, step (S1) may include the steps of: (S11) preparing a composition containing a plurality of polymer particles dispersed in a solvent; (S12) applying the composition onto a substrate, followed by drying, to form a preliminary porous structure; (S13) pressurizing the product of step (S12) to form a porous structure; and (S14) impregnating the porous structure with a liquid electrolyte to obtain a solid-liquid hybrid electrolyte membrane.

Herein, the application and drying may be carried out by using a method used conventionally in the art (S12). This step is shown in FIG. 2(b). As shown in FIG. 2(b), a method of dispersing the polymer particles in a solvent and coating the resultant dispersion may be used in order to apply the polymer particles uniformly onto a substrate. Herein, after coating the dispersion on the substrate, the solvent evaporates to leave a residual material, but the scope of the present disclosure is not limited thereto, and a residual material may remain depending on purposes.

Next, the product of step (S12) may be pressurized to form a porous structure (S13). According to an embodiment of the present disclosure, the solid polymer particles may form a porous structure through the pressurization step. Herein, the solid polymer particles can be bound physically to one another by pressurization or heating, and there is no need for any separate binder polymer.

Herein, a separate porous polymer substrate or non-woven web substrate may be used additionally in order to enhance the mechanical strength of the porous structure.

In this manner, a solid-liquid hybrid electrolyte membrane showing reduced resistance may be obtained. This is shown in FIG. 2(c). For example, the pressurization step may be carried out once or several times with a predetermined gap in order to provide a desired porous structure and/or thickness and porosity of the solid-liquid hybrid electrolyte membrane.

Then, the porous structure may be impregnated with a predetermined amount of liquid electrolyte (S14). Herein, impregnation with the liquid electrolyte may be carried out by any one of dip coating, spray coating and drop coating, but is not limited thereto. Meanwhile, the content of the liquid electrolyte is 30-40 wt % based on 100 wt % of the total content of the solid-liquid hybrid electrolyte membrane. Since the content of the liquid electrolyte satisfies a desired numerical range as mentioned above, pressurization of an electrode assembly after the manufacture thereof provides the porous structure with increased density, and the liquid electrolyte contained in the porous structure is ejected and transferred to the electrode active material layers. As a result, the resultant solid-state battery shows increased ion conductivity without any separate step of injecting a liquid electrolyte, and the porous structure has increased density due to the pressurization to provide improved mechanical strength. After step (S14), a step of removing the substrate may be further carried out (S15). For example, the method may further include a step of removing a release film. Herein, when using a release film as a substrate, the release film shows poor wettability with an electrolyte, and thus a large amount of electrolyte cannot be leaked from the porous structure. In addition, since the release film surrounds the solid-liquid hybrid electrolyte membrane, it is possible to reduce electrolyte leakage.

Then, the solid-liquid hybrid electrolyte membrane is interposed between electrodes to form an electrode assembly (S2). The method for interposing the solid-liquid hybrid electrolyte membrane between electrodes is not particularly limited, and any method used conventionally in the art may be used.

After that, the electrode assembly is pressurized (S3). In the pressurization step, the liquid electrolyte in the solid-liquid hybrid electrolyte membrane is ejected and introduced into the electrodes. In other words, in this step, the liquid electrolyte contained in the solid-liquid hybrid electrolyte membrane infiltrates into the positive electrode and negative electrode under the pressurization, thereby providing a solid-state battery with improved ion conductivity. As a result, since the electrolyte is dispersed homogeneously in the electrode assembly by the pressurization, the method is free of a separate step of injecting an electrolyte, or may include a step of injecting merely a small amount of liquid electrolyte.

Meanwhile, according to an embodiment of the present disclosure, it is possible to determine whether the electrodes are impregnated with the electrolyte or not by comparing the thickness of the electrode assembly after the pressurization with that of the electrode assembly before the pressurization.

More particularly, according to an embodiment of the present disclosure, the ratio (B/A) of the thickness (B) of the solid-liquid hybrid electrolyte membrane after pressurizing the electrode assembly based on the thickness (A) of the solid-liquid hybrid electrolyte membrane before pressurizing the electrode assembly is 86-92%.

According to the present disclosure, each of the positive electrode and the negative electrode includes a current collector, and an electrode active material layer formed on at least one surface of the current collector, wherein the electrode active material layer includes a plurality of electrode active material particles and a solid electrolyte. In addition, the electrodes may further include at least one of a conductive material and a binder resin. Further, the electrode may further include various additives in order to supplement or improve the physicochemical properties of the electrode.

According to the present disclosure, any negative electrode active material may be used, as long as it can be used as a negative electrode active material for a lithium ion secondary battery. Particular examples of the negative electrode active material include any one selected from: carbon, such as non-graphitizable carbon or graphitic carbon; metal composite oxides such as $Li_xFe_2O_3$ ($0 \leq x \leq 1$), $Li_xWO_2$ ($0 \leq x \leq 1$), $Sn_xMe_{1-x}Me'_yO_z$ (Me: Mn, Fe, Pb or Ge; Me': Al, B, P, Si, an element of Group 1, Group 2 or Group 3 in the Periodic Table, or halogen; $0<x\leq1$; $1\leq y\leq3$; $1\leq z\leq8$); lithium metal; lithium alloys; silicon-based alloys; tin-based alloys; metal oxides such as $SnO$, $SnO_2$, $PbO$, $PbO_2$, $Pb_2O_3$, $Pb_3O_4$, $Sb_2O_3$, $Sb_2O_4$, $Sb_2O_5$, $GeO$, $GeO_2$, $Bi_2O_3$, $Bi_2O_4$, $Bi_2O_5$, or the like; conductive polymers such as polyacetylene; Li—Co—Ni based materials; titanium oxide; and lithium titanium oxide, or the like, or two or more of them. Particularly, the negative electrode active material may include a carbonaceous material and/or Si.

In the case of the positive electrode, any positive electrode active material may be used with no particular limitation, as long as it can be used as a positive electrode active material for a lithium ion secondary battery. Particular examples of the positive electrode active material include, but are not limited to: layered compounds such as lithium cobalt oxide ($LiCoO_2$) and lithium nickel oxide ($LiNiO_2$), or those compounds substituted with one or more transition metals; lithium manganese oxides such as those represented by the chemical formula of $Li_{1+x}Mn_{2-x}O_4$ (wherein x is 0-0.33), $LiMnO_3$, $LiMn_2O_3$ and $LiMnO_2$; lithium copper oxide ($Li_2CuO_2$); vanadium oxides such as $LiV_3O_8$, $LiV_3O_4$, $V_2O_5$ or $Cu_2V_2O_7$; Ni-site type lithium nickel oxides represented by the chemical formula of $LiNi_{1-x}M_xO_2$ (wherein M is Co, Mn, Al, Cu, Fe, Mg, B or Ga, and x is 0.01-0.3); lithium manganese composite oxides represented by the chemical formula of $LiMn_{2-x}M_xO_2$ (wherein M is Co, Ni, Fe, Cr, Zn or Ta, and x is 0.01-0.1), or $Li_2Mn_3MO_8$ (wherein M is Fe, Co, Ni, Cu or Zn); lithium manganese composite oxides having a spinel structure and represented by the formula of $LiNi_xMn_{2-x}O_4$; $LiMn_2O_4$ in which Li is partially substituted with an alkaline earth metal ion; disulfide compounds; disulfide compounds; $Fe_2(MoO_4)_3$; or the like.

According to the present disclosure, the current collector includes a metal plate having electrical conductivity and may be one selected suitably depending on polarity of electrodes known in the field of secondary batteries.

According to the present disclosure, the conductive material is added generally in an amount of 1-30 wt % based on the total weight of the mixture including the electrode active material. The conductive material is not particularly limited, as long as it causes no chemical change in the corresponding battery and has conductivity. For example, the conductive material include any one selected from: graphite, such as natural graphite or artificial graphite; carbon black, such as carbon black, acetylene black, Ketjen black, channel black, furnace black, lamp black or thermal black; conductive fibers, such as carbon fibers or metallic fibers; metal powder, such as carbon fluoride, aluminum or nickel powder; conductive whisker, such as zinc oxide or potassium titanate; conductive metal oxide, such as titanium oxide; and conductive materials, such as polyphenylene derivatives, or a mixture of two or more of them.

According to the present disclosure, the binder resin is not particularly limited, as long as it is an ingredient which assists binding of the electrode active material with the conductive material, and binding to the current collector. Particular examples of the binder resin include polyvinylidene fluoride, polyvinyl alcohol, carboxymethyl cellulose (CMC), starch, hydroxypropyl cellulose, regenerated cellulose, polyvinyl pyrrolidone, tetrafluoroethylene, polyethylene, polypropylene, ethylene-propylene-diene monomer terpolymer (EPDM), sulfonated EPDM, styrene butadiene rubber, fluororubber, various copolymers, or the like. In general, the binder resin may be used in an amount of 1-30 wt %, or 1-10 wt %, based on 100 wt % of electrode active material layer.

Meanwhile, according to the present disclosure, each electrode active material layer may include at least one additive, such as an oxidation stabilizing additive, reduction stabilizing additive, flame retardant, heat stabilizer, antifogging agent, or the like, if necessary.

According to the present disclosure, the solid electrolyte may include at least one of a polymeric solid electrolyte, an oxide-based solid electrolyte and a sulfide-based solid electrolyte.

According to the present disclosure, each of the positive electrode and the negative electrode may use a different solid electrolyte, or the same solid electrolyte may be used for two or more battery elements. For example, in the case of a positive electrode, an electrolyte material having high oxidation stability may be used as a solid electrolyte. In addition, in the case of a negative electrode, an electrolyte material having high reduction stability may be used as a solid electrolyte. However, the scope of the present disclosure is not limited thereto. Since the solid electrolyte mainly functions to conduct lithium ions in the electrodes, any material having a high ion conductivity, such as $10^{-7}$ S/m or more, or $10^{-7}$ S/m or more, may be used, and the solid electrolyte material is not limited to any specific ingredient.

According to the present disclosure, the polymer electrolyte may be a solid polymer electrolyte formed by adding a polymer resin to a lithium salt solvated independently, or may be a polymer gel electrolyte prepared by impregnating a polymer resin with an organic electrolyte containing an organic solvent and a lithium salt.

The examples and test examples will now be described. The following examples are for illustrative purposes only and not intended to limit the scope of this disclosure.

Example 1

1) Manufacture of Solid-Liquid Hybrid Electrolyte Membrane

First, 3 mL of a dispersion prepared by dispersing powder-type polyphenylene sulfide (average particle diameter: 10 μm) as solid polymer particles in ethanol to a concentration of 1 g/4 mL was applied to a PET non-woven web (porosity 78 vol %) having a thickness of 40 μm, followed by drying, to obtain a preliminary porous structure. Next, the preliminary porous structure having a total thickness of 83 μm was pressed by using a roll press to form a porous structure (porosity 36 vol %) having a thickness of 50 μm.

Then, the pores of the porous structure were drop coated with 0.01 mL of a liquid electrolyte (ethylene carbonate: ethyl methyl carbonate=3:7 (vol %), $LiPF_6$ 1 M, vinylene carbonate 0.5 vol %, fluoroethylene carbonate 1 vol %), followed by drying, to obtain a solid-liquid hybrid electrolyte membrane. The resultant solid-liquid hybrid electrolyte membrane had a thickness (A) of 50 μm and a porosity of 0%.

2) Preparation of Negative Electrode

Li metal (thickness 20 μm) available from Honjo Co. was prepared as a negative electrode.

3) Manufacture of Positive Electrode

First, NCM811 ($LiNi_{0.8}Co_{0.1}Mn_{0.1}O_2$) as a positive electrode active material, vapor grown carbon fibers (VGCF) as a conductive material and a polymeric solid electrolyte (PEO+LiTFSi, [EO]/[$Li^+$]=18:1, molar ratio) were mixed at a weight ratio of 80:3:17. The resultant mixture was applied to an aluminum current collector having a thickness of 20 μm by using a doctor blade, and the resultant product was vacuum dried at 120° C. for 4 hours. Then, the vacuum dried product was pressed by using a roll press to obtain a positive electrode having a positive electrode slurry loading amount of 3 mAh/cm² and a porosity of 22%.

4) Manufacture of Solid-Sate Battery

The positive electrode obtained as described above was cut into a circular shape having an area of 1.4875 cm². In addition, the negative electrode cut into a circular shape having an area of 1.7671 cm² was prepared. Next, the solid-liquid hybrid electrolyte membrane obtained from 1) was interposed between the positive electrode and the negative electrode, and the resultant structure was pressurized under 5 MPa. After pressurizing the electrode assembly, the porous structure had a thickness (B) of 45 μm. The ratio (B/A) of the thickness (B) of the solid-electrolyte hybrid electrolyte membrane after pressurizing the electrode assembly based on the thickness (A) of the solid-liquid hybrid electrolyte membrane before pressurizing the electrode assembly, particularly, the solid-liquid hybrid electrolyte membrane formed by pressurizing the preliminary porous structure and impregnating the preliminary porous structure with a liquid electrolyte, was 90%. After that, the electrode assembly was used to obtain a half-cell. Herein, there is no separate step of injecting an electrolyte.

Example 2

1) Manufacture of Solid-Liquid Hybrid Electrolyte Membrane

First, 3 mL of a dispersion prepared by dispersing powder-type polyphenylene sulfide (average particle diameter: 10 μm) as solid polymer particles in ethanol to a concentration of 1 g/4 mL was applied to a PET non-woven web (porosity 78 vol %) having a thickness of 40 μm, followed by drying, to obtain a preliminary porous structure. Next, the preliminary porous structure having a total thickness of 83 μm was pressed by using a roll press to form a porous structure (porosity 36 vol %) having a thickness of 50 μm.

Then, the pores of the porous structure were drop coated with 0.007 mL of a liquid electrolyte (ethylene carbonate: ethyl methyl carbonate=3:7 (vol %), $LiPF_6$ 1 M, vinylene carbonate 0.5 vol %, fluoroethylene carbonate 1 vol %), followed by drying, to obtain a solid-liquid hybrid electrolyte membrane. The resultant solid-liquid hybrid electrolyte membrane had a thickness (A) of 50 μm and a porosity of 5 vol %.

2) Manufacture of Solid-Sate Battery

The solid-liquid hybrid electrolyte membrane obtained as described above was interposed between the positive electrode and the negative electrode as described in Example 1, and the resultant structure was pressurized under 5 MPa.

The ratio (B/A) of the thickness (B) of the solid-electrolyte hybrid electrolyte membrane after pressurizing the electrode assembly based on the thickness (A) of the solid-liquid hybrid electrolyte membrane before pressurizing the electrode assembly was 86%. After that, the electrode assembly was used to obtain a half-cell. Herein, there is no separate step of injecting an electrolyte.

Example 3

1) Manufacture of Solid-Liquid Hybrid Electrolyte Membrane

A solid-liquid hybrid electrolyte membrane was obtained in the same manner as Example 1, except that the dispersion prepared according to Example 1 was applied not to a non-woven web substrate but to a positive electrode active material layer including a solid electrolyte, followed by drying.

Particularly, NCM811 ($LiNi_{0.8}Co_{0.1}Mn_{0.1}O_2$) as a positive electrode active material, vapor grown carbon fibers (VGCF) as a conductive material and a polymeric solid electrolyte (PEO+LiTFSi, [EO]/[$Li^+$]=18:1, molar ratio) were mixed at a weight ratio of 80:3:17. The resultant mixture was applied to an aluminum current collector having a thickness of 10 μm, followed by drying, to obtain a positive electrode.

Then, 3 mL of the dispersion prepared according to Example 1 was applied to the positive electrode, followed by drying, to obtain a preliminary porous structure. Herein, the preliminary porous structure had a thickness of 89 μm.

After that, the preliminary porous structure was pressed by using a roll press to form a porous structure (porosity 36 vol %) having a thickness of 50 μm.

Then, the pores of the porous structure were drop coated with a liquid electrolyte (ethylene carbonate:ethyl methyl carbonate=3:7 (vol %), LiPF$_6$ 1 M, vinylene carbonate 0.5 vol %, fluoroethylene carbonate 1 vol %), followed by drying, to obtain a solid-liquid hybrid electrolyte membrane. The resultant solid-liquid hybrid electrolyte membrane had a thickness (A) of 50 μm and a porosity of 0 vol %.

2) Manufacture of Solid-Sate Battery

The solid-liquid hybrid electrolyte membrane obtained as described above was interposed in such a manner that it might face the negative electrode according to Example 1, and the resultant structure was pressurized under 5 MPa.

The ratio (B/A) of the thickness (B) of the solid-electrolyte hybrid electrolyte membrane after pressurizing the electrode assembly based on the thickness (A) of the solid-liquid hybrid electrolyte membrane before pressurizing the electrode assembly was 92%. After that, the electrode assembly was used to obtain a half-cell. Herein, there is no separate step of injecting an electrolyte.

Comparative Example 1—Manufacture of Electrolyte Membrane

An electrolyte membrane was obtained in the same manner as Example 1, except that impregnation with a liquid electrolyte was not carried out.

Particularly, the electrolyte membrane was obtained as follows.

First, 3 mL of a dispersion prepared by dispersing powder-type polyphenylene sulfide (average particle diameter: 10 μm) as solid polymer particles in ethanol to a concentration of 1 g/4 mL was applied to a PET non-woven web (porosity 78 vol %) having a thickness of 40 μm, followed by drying, to obtain a preliminary porous structure. Then, the preliminary porous structure having a total thickness of 83 μm was pressed by using a roll press to form a porous structure (porosity 36 vol %) having a thickness of 50 μm.

Comparative Example 2

1) Manufacture of Electrolyte Membrane

An electrolyte membrane was obtained by mixing a liquid electrolyte with solid polymer particles at once, not by impregnating a porous structure with a liquid electrolyte after forming the porous structure. Particularly, the electrolyte membrane was obtained as follows.

First, powder-type polyphenylene sulfide (average particle diameter: 10 μm) was prepared as solid polymer particles. In addition, as a liquid electrolyte, prepared was a mixture of ethylene carbonate:ethyl methyl carbonate=3:7 (vol %), LiPF$_6$ 1 M, vinylene carbonate 0.5 vol % and fluoroethylene carbonate 1 vol %.

Then, the solid polymer particles were mixed with the liquid electrolyte at a volume ratio of 7:3 to prepare a dispersion containing the solid polymer particles dispersed therein. After that, the dispersion was applied onto a polyethylene terephthalate film, followed by drying. Then, the resultant structure was allowed to pass through a roll press in order to obtain an electrolyte membrane. However, it was not possible to obtain an electrolyte membrane. It is thought that this is because a high content of liquid electrolyte is used and the contact surfaces among the solid polymer particles are insufficient to cause degradation of adhesive force among the solid polymer particles, and the liquid electrolyte functions like lubricant oil, while passing the coated polyethylene terephthalate film through a roll press, and disturbs formation of a membrane.

Comparative Example 3

1) Manufacture of Electrolyte Membrane

An electrolyte membrane was obtained in the same manner as Comparative Example 2, except that the dispersion according to Comparative Example 2 was applied to and dried on a non-woven web (porosity: 87 vol %) having a thickness of 38 μm, instead of the polyethylene terephthalate film. In other words, in the electrolyte membrane of Comparative Example 3, the solid polymer particles are introduced into the pores of the non-woven web substrate. When using a non-woven web to solve the problems of Comparative Example 2, an electrolyte membrane itself can be formed, but the electrolyte membrane shows non-uniform ion conductivity and the adhesive strength between the non-woven web and the solid polymer particles is low to cause degradation of durability.

Therefore, the electrolyte membrane is limited in its maintenance.

Comparative Example 4—Conventional Solid Electrolyte Membrane

1) Manufacture of Solid Electrolyte Membrane

Polyethylene oxide (PEO, Mw=4,000,000 g/mol) was dissolved in acetonitrile (AN) as a solvent to prepare a polymer solution having a concentration of 4 wt %. Herein, LiTFSI as a lithium salt was added thereto to a molar ratio of [EO]/[Li$^+$] of 18/1. The resultant mixture was agitated overnight at 70° C. so that PEO and the lithium salt might be dissolved sufficiently in the polymer solution. Next, an additive solution containing an initiator and a curing agent was prepared. The curing agent was polyethylene glycol diacrylate (PEGDA, M$_w$=575), the initiator was benzoyl peroxide (BPO), PEGDA was used in an amount of 20 wt % based on PEO, BPO was used in an amount of 1 wt % based on PEGDA, and acetonitrile was used as a solvent. The additive solution was agitated for about 1 hour so that the ingredients introduced thereto might be mixed thoroughly. Then, the additive solution was added to the polymer solution and the two solutions were mixed thoroughly. The mixed solution was applied to and coated on a release film by using a doctor blade. The coating gap was set to 800 μm and the coating rate was set to 20 mm/min. The release film coated with the solution was transferred to a glass plate, allowed to maintain level, dried overnight at room temperature, and vacuum dried at 100° C. for 12 hours. In this manner, a first solid electrolyte layer and a second solid electrolyte layer was obtained. The resultant first solid electrolyte layer and second solid electrolyte layer had a thickness of about 50 μm.

2) Manufacture of Solid-Sate Battery

The electrolyte membrane obtained as described above was interposed between the positive electrode and the negative electrode according to Example 1, and the resultant structure was pressurized under 5 MPa.

The ratio (B/A) of the thickness (B) of the solid-electrolyte hybrid electrolyte membrane after pressurizing the electrode assembly based on the thickness (A) of the solid-liquid hybrid electrolyte membrane before pressurizing the electrode assembly was 100%. After that, the electrode assembly was used to obtain a half-cell. Herein, there is no separate step of injecting an electrolyte.

Comparative Example 5

1) Manufacture of Solid-Liquid Hybrid Electrolyte Membrane

First, 3 mL of a dispersion prepared by dispersing powder-type polyphenylene sulfide (average particle diameter: 10 µm) as solid polymer particles in ethanol to a concentration of 1 g/2 mL was applied to a PET non-woven web (porosity 78 vol %) having a thickness of 40 µm, followed by drying, to obtain a preliminary porous structure. Next, the preliminary porous structure having a total thickness of 200 µm was pressed by using a roll press to form a porous structure (porosity 21 vol %) having a thickness of 40 µm.

Then, the pores of the porous structure were drop coated with a liquid electrolyte (ethylene carbonate:ethyl methyl carbonate=3:7 (vol %), $LiPF_6$ 1 M, vinylene carbonate 0.5 vol %, fluoroethylene carbonate 1 vol %), followed by drying, to obtain a solid-liquid hybrid electrolyte membrane. The resultant solid-liquid hybrid electrolyte membrane had a thickness (A) of 40 µm and a porosity of 0 vol %.

2) Manufacture of Solid-Sate Battery

The solid-liquid hybrid electrolyte membrane obtained as described above was interposed between the positive electrode and the negative electrode as described in Example 1, and the resultant structure was pressurized under 5 MPa.

The ratio (B/A) of the thickness (B) of the solid-electrolyte hybrid electrolyte membrane after pressurizing the electrode assembly based on the thickness (A) of the solid-liquid hybrid electrolyte membrane before pressurizing the electrode assembly was 97.5%. After that, the electrode assembly was used to obtain a half-cell. Herein, there is no separate step of injecting an electrolyte.

the ingredients contained in the solid electrolyte membrane and the density of each ingredient, and then the porosity was calculated from the difference between the apparent density and the true density.

Determination of Ion Conductivity of Electrolyte Membrane

Each of the electrolyte membranes according to Examples and Comparative Examples was cut into a circular shape having a size of 1.7671 $cm^2$, and the electrolyte membrane was disposed between two stainless steel sheets to obtain a coin-cell. Then, electrochemical impedance was measured by using an analyzer (VMP3, Biologic science instrument) at room temperature under the conditions of an amplitude of 10 mV and a scan range of 500 kHz to 0.1 MHz. Based on this, ion conductivity was calculated.

Determination of Content of Liquid Electrolyte in Solid-Liquid Hybrid Electrolyte Membrane The content of a liquid electrolyte in a solid-liquid hybrid electrolyte membrane was calculated by the formula of [Weight of solid-liquid hybrid electrolyte membrane–Weight of porous structure].

Evaluation of Initial Discharge Capacity and Life Characteristics

Each of the batteries according to Examples 1-3 and Comparative Examples 1-5 was charged/discharged at 0.05C at room temperature or at 60° C. to evaluate the initial discharge capacity.

Charge Condition: CC (constant current)/CV (constant voltage) (4.25 V, 0.005 C current cut-off)

Discharge Condition: CC (constant current) condition 3 V, (0.05 C)

TABLE 1

| | Thickness of preliminaty porous structure (µm) | Porosity of porous structure formed by pressurizing preliminary porous structure (vol %) | Thickness (A) of porous structure before pressurizing electrode assembly (µm) | Content of liquid electrolyte in solid-liquid hybrid electrolyte membrane (based on total weight of solid-liquid hybrid electrolyte membrane) (%) | Thickness (B) of porous structure after pressurizing electrode assembly (µm) | Ratio of B/A (%) | Ion conductivity (S/cm, room temperature) | Positive electrode CHC @4.25 V, room temperature |
|---|---|---|---|---|---|---|---|---|
| Ex. 1 | 83 | 36 | 50 | 36 | 45 | 90 | $7.88 \times 10^{-4}$ | 203 |
| Ex. 2 | 83 | 36 | 50 | 31 | 43 | 86 | $6.76 \times 10^{-4}$ | 202 |
| Ex. 3 | 89 | 36 | 50 | 36 | 46 | 92 | — | 205 |
| Comp. Ex. 1 | 83 | 36 | 50 | 36 | — | — | Not available | — |
| Comp. Ex. 2 | 160 | <3 | Not obtained | — | — | — | — | — |
| Comp. Ex. 3 | 160 | <3 | Not obtained | — | — | — | — | — |
| Comp. Ex. 4 | — | <5 | 50 | <5 | 50 | 100 | $9.95 \times 10^{-5}$ @60° C. | 126 @4.0 V, 60° C. |
| Comp. Ex. 5 | 200 | 21 | 40 | 21 | 39 | 97.5 | $5.39 \times 10^{-4}$ | 183 |

Test Examples

Determination of Porosity

Each of the porous structures and electrolyte membranes according to Examples and Comparative Examples was cut into a size of 1.7671 $cm^2$, the weight and volume of each electrolyte membrane were measured (apparent density was measured), and the apparent density was compared with a designed value (true density) to calculate the porosity. In other words, the true density of each solid electrolyte membrane was calculated from the compositional ratio of Meanwhile, 'room temperature' in Table 1 refers to a condition controlled to about 18-27° C. As can be seen from Table 1, particles having no ion conductivity can be used to form a support and the internal part of the support is impregnated with a small amount of electrolyte to obtain a composite electrolyte layer having excellent ion conductivity. The composite electrolyte layer shows excellent properties, such as physical properties and ion conductivity, as compared to conventional solid electrolytes exemplified by PEO. In addition, the amount of electrolyte used herein is 2-15 µL, which is significantly smaller than the amount of the conventional electrolyte, 20-50 µL. However, since the support has low solubility to the electrolyte, the electrolyte is rearranged effectively toward the electrodes due to the pressure applied during the manufacture of an electrode assembly to ensure ion conductivity and to allow operation as a battery. The battery shows performance significantly higher than the performance of the conventional battery using PEO. However, when the electrolyte membrane undergoes a small change in thickness, like Comparative Example 5, or when the absolute amount of electrolyte is excessively small, it is not possible to improve the performance of a battery sufficiently.

DESCRIPTION OF DRAWING NUMERALS

100: Solid-state battery
10: Positive electrode
11: Positive electrode active material
20: Negative electrode
21: Negative electrode active material
30: Solid-liquid hybrid electrolyte membrane
31: Solid polymer particles
32: Liquid electrolyte
33: Porous structure
40: Substrate

What is claimed is:

1. A method for manufacturing a solid-state battery, comprising:
   (S1) preparing a solid-liquid hybrid electrolyte membrane comprising a plurality of solid polymer particles and a liquid electrolyte,
   wherein the solid polymer particles are packed, while being in contact with one another, and comprise a porous structure having pores formed in free space between the solid polymer particles,
   the liquid electrolyte fills the portions in which the solid polymer particles are in surface contact with one another, or surfaces of the solid polymer particles, and
   a content of the liquid electrolyte is 30-40 wt % based on 100 wt % of a total content of the solid-liquid hybrid electrolyte membrane;
   (S2) interposing the solid-liquid hybrid electrolyte membrane between electrodes to obtain an electrode assembly; and
   (S3) pressurizing the electrode assembly,
   wherein a ratio (B/A) of a thickness (B) of the solid-liquid hybrid electrolyte membrane after pressurizing the electrode assembly based on a thickness (A) of the solid-liquid hybrid electrolyte membrane before pressurizing the electrode assembly is 86-92%.

2. The method for manufacturing a solid-state battery according to claim 1, wherein step (S1) comprises:
   (S11) preparing a composition containing a plurality of polymer particles dispersed in a solvent;
   (S12) applying the composition onto a substrate, followed by drying, to form a preliminary porous structure;
   (S13) pressurizing the preliminary porous structure to form a porous structure; and
   (S14) impregnating the porous structure with a liquid electrolyte to obtain a solid-liquid liquid hybrid electrolyte membrane.

3. The method for manufacturing a solid-state battery according to claim 1, wherein step (S3) is carried out by pressurizing the electrode assembly so that the liquid electrolyte in the solid-liquid hybrid electrolyte membrane is ejected and the electrodes is impregnated with the liquid electrolyte.

4. The method for manufacturing a solid-state battery according to claim 1, wherein the solid polymer particle is an engineering plastic resin.

5. The method for manufacturing a solid-state battery according to claim 1, wherein the solid polymer particle comprises at least one selected from the group consisting of polyphenylene sulfide, polyetherether ketone, polyimide, polyamideimide, liquid crystal polymer, polyether imide, polysulfone, polyarylate, polyethylene terephthalate, polybutylene terephthalate, polyoxymethylene, polycarbonate, polypropylene, polyethylene and polymethyl methacrylate, or two or more of them.

6. The method for manufacturing a solid-state battery according to claim 1, wherein the solid-liquid hybrid electrolyte membrane is free of a binder polymer.

7. The method for manufacturing a solid-state battery according to claim 1, which does not include a step of injecting an electrolyte.

8. The method for manufacturing a solid-state battery according to claim 1, wherein the content of the liquid electrolyte is 31-36 wt % based on the total content of the solid polymer particles.

9. The method for manufacturing a solid-state battery according to claim 2, wherein the impregnation in step (S14) is carried out by any one of dip coating, spray coating or drop coating.

10. The method for manufacturing a solid-state battery according to claim 1, wherein the solid-liquid hybrid electrolyte membrane further comprises a porous polymer substrate or a non-woven web substrate.

* * * * *